United States Patent

Kostrzewski et al.

[11] Patent Number: 5,856,389
[45] Date of Patent: Jan. 5, 1999

[54] SOLID THERMOPLASTIC SURFACING MATERIAL

[75] Inventors: Witold Kostrzewski, Severn; Leonard Elbon, Glen Burnie; Robin D. O'Dell; Eric Franzoi, both of Pasadena, all of Md.

[73] Assignee: International Paper, Odenton, Md.

[21] Appl. No.: 770,252

[22] Filed: Dec. 20, 1996

Related U.S. Application Data

[63] Continuation-in-part of Ser. No. 576,590, Dec. 21, 1995, abandoned.

[51] Int. Cl.$^6$ .................... C08J 3/20; C08J 5/18; C08K 3/00
[52] U.S. Cl. ................. 524/400; 524/447; 525/227; 525/230
[58] Field of Search .................... 525/230, 227; 524/400, 447

[56] References Cited

U.S. PATENT DOCUMENTS

| | | | |
|---|---|---|---|
| 4,232,078 | 11/1980 | Kamada et al. | 428/195 |
| 4,260,692 | 4/1981 | Komai et al. | 525/273 |
| 5,418,048 | 5/1995 | Daff et al. | 428/213 |
| 5,485,145 | 1/1996 | Sniff | 345/45 |
| 5,658,847 | 8/1997 | Goss et al. | 503/227 |

FOREIGN PATENT DOCUMENTS 2024940  12/1971  Germany.

*Primary Examiner*—Jeffrey C. Mullis
*Attorney, Agent, or Firm*—Browdy and Neimark

[57] ABSTRACT

A solid thermoplastic filler-filled surfacing material having a deep semi-translucent appearance, in the form of a thin, rigid sheet contains 19–25% polymethyl methacrylate, 19–25% styrene acrylonitrile copolymer, 5–20% styrene maleic anhydride copolymer, and 30–60% finely divided filler of barium sulfate, kaolin, basic aluminum oxalate and/or wollastonite.

20 Claims, No Drawings

SOLID THERMOPLASTIC SURFACING MATERIAL

This is a continuation-in-part of parent application Ser. No. 08/576,590, filed Dec. 21, 1995 now abandoned.

FIELD OF INVENTION

The present invention relates to decorative surfacing materials; and, more particularly, to a lower cost thin surfacing material predominantly formed of thermoplastic materials, which can simulate non-transparent stone-like products and can be substituted in certain environments for the considerably more expensive products formed of thermoset materials and commercially sold by Dupont under the name CORIAN® and by International Paper under the name FOUNTAINHEAD®.

BACKGROUND OF THE INVENTION

Surfacing materials of various types have been known for many years, including high pressure decorative laminates and low pressure laminates. The former are formed of a plurality of thermoset resin impregnated paper sheets, the core sheets being impregnated with phenolic resin and the surface sheet or sheets being impregnated with melamine resin. These products have achieved great popularity and success over the years and have been long used as countertops, tabletops, wall coverings, etc.

Low pressure laminates are usually based on thermoset melamine resin impregnated facing sheets, with backing substrates formed of a wide variety of materials. Low pressure laminates are also used as wall panelling, and simulating wood in the manufacture of lower cost furniture, etc., and do not possess all of the admirable qualities of high pressure decorative laminate.

More recently, products of the CORIAN® and FOUNTAINHEAD® type have entered the marketplace and these have achieved wide acceptance as countertops and the like in kitchens and bathrooms in particular. Some of these materials, hereinafter generically referred to as "solid surfacing material", were originally designed to simulate stone products such as marble and granite, but now come in a wide variety of patterns. These solid surfacing materials are normally formed in thick slabs of thermoset acrylic or thermoset polyester, filled with various fillers including ATH, ground stone, etc. These products have a deep semi-translucent[1] and lustrous appearance and are highly desired among designers and consumers, but on the other hand are very expensive, indeed usually more expensive than natural marble and granite.

[1] What is meant by "deep semi-translucent" is that these products, while opaque to the passage of light therethrough, can nevertheless be seen into to an extent, and give the appearance of three-dimensional depth.

Solid thermoset surfacing materials of this type are normally formed in thick slabs, and so material costs are high on an area-of-coverage basis. Moreover, fabrication into products and installation of products based on these solid surfacing materials, including kitchen and bathroom countertops, involve a considerable amount of skilled manual labor, which further drives up the costs of these products on an installed basis.

More recently, General Electric has entered the marketplace with a product called NUVEL™ which is believed to be an extruded thermoplastic product containing a thermoplastic polyester, i.e. polyethylene terephthalate and/or polybutylene terephthalate, and a polycarbonate, filled with barium sulfate. We are aware of a General Electric patent in the name of Fisher et al, U.S. Pat. No. 5,149,734, which discloses a molding material which is a blend of polybutylene terephthalate and polyethylene terephthalate, filled with 30–85%, based on the total weight, of barium sulfate, said to have special utility for the injection molding of articles such as tableware including dishes, bowls or mugs; billiard balls, poker chips, paper weights, wall or floor tiles and the like, and which also may be used to mold circuit boards or panels. The composition is said to produce molded objects having a smooth and glossy surface, a ceramic-like feel and appearance, superior stain resistance, opacity to x-rays, freedom from warpage, excellent creep resistance, a low coefficient of thermal expansion and a high heat distortion temperature.

DE 2 024 940, published Dec. 2, 1971, discloses a blend of thermoplastic molding materials so as to cast a clear lens of high transparency. The resultant lens material, said to be useful in the lighting sector, for household optical purposes, or for the production of household vessels, is also said to have good heat resistance in addition to a high degree of transparency. The polymers to be blended are styrene-maleic acid anhydride copolymers and methyl methacrylate polymers. Styrene-acrylonitrile copolymers can be added to the molding materials to increase pourability for casting.

There is still a need for an improved, lower-cost, thermoplastic sheet for use as a surfacing material which can replace solid surfacing materials of the FOUNTAINHEAD® and CORIAN® type in at least some of their environments, and which has a deep semi-translucent appearance similar to such solid surfacing material and a comparable surface hardness.

SUMMARY OF THE INVENTION

It is, accordingly, an object of the present invention to provide an improved thermoplastic surfacing material having a deep semi-translucent appearance and surface hardness comparable to those of solid surfacing materials of the FOUNTAINHEAD® and CORIAN® type, but which are far less expensive to manufacture.

It is another object of the present invention to provide a thin solid surfacing material which looks like solid surfacing materials of the FOUNTAINHEAD® and CORIAN® type after installation, but is capable of installation in a manner similar to and as inexpensively as that of high and low pressure laminates.

It is a further object of the present invention to provide such a thin solid surfacing material of thermoplastic material which has a much lower cost after installation compared with solid surfacing material of the FOUNTAINHEAD® and CORIAN® type, and an appearance and surface hardness comparable thereto.

It is yet another object of the present invention to provide a new thermoplastic solid surfacing material which has lower material cost, lower manufacturing cost and lower fabricating cost compared with traditional solid surfacing materials of the FOUNTAINHEAD® and CORIAN® types.

It is yet a further object of the present invention to provide a new thermoplastic solid surfacing material which has improved physical properties over the known thermoplastic material, NUVEL™.

These and other objects are achieved according to the present invention by extruding into relatively thin sheet form a composition consisting essentially of (1) a transparent or clear thermoplastic acrylic polymer, preferably polymethylmethacrylate (PMMA), (2) a clear or transparent impact enhancer thermoplastic polymer, preferably styrene-acrylonitrile copolymer (SAN), (3) a clear or transparent compatibilizing thermoplastic polymer, preferably styrene-maleic anhydride copolymer (SMA), and (4) an inorganic filler having an index of refraction similar to that of the polymers, such as barium sulfate, wollastonite, basic aluminum oxalate, or kaolin, and thus obtaining a thin solid rigid thermoplastic surfacing material having a deep semi-translucent appearance.

The nature and advantages of the present invention will be better understood by reference to the following detailed description of certain specific embodiments.

DETAILED DESCRIPTION OF EMBODIMENTS

The composition of the present invention consists of four major components and may include several minor components. The major components are:

the clear acrylic thermoplastic, preferably polymethyl methacrylate (PMMA), is present in an amount of 16–28%, preferably 19–25%, based on the total weight, and which provides the resultant rigid sheet material with rigidity, surface hardness, UV and light stability, stain resistance and thermoformability;

the clear thermoplastic impact enhancer polymer, preferably styrene acrylonitrile copolymer (SAN), is present in the amount of 16–28% by weight based on 100% of total weight of all the components, preferably 19–25%, which adds extrudability, toughness, impact resistance and thermoformability. The SAN may be replaced in whole or in part by other transparent rubbery thermoplastic polymers which will enhance the impact resistance of the acrylic polymer; the clear thermoplastic compatibilizing polymer, preferably styrene-maleic anhydride copolymer (SMA) with a maleic anhydride content of no more than 10%, present in an amount of 5–20% based on the total weight, preferably 8–15%, provided in order to compatibilize the PMMA and the SAN which are normally incompatible. The SMA may be replaced in whole or in part by any other clear thermoplastic which is capable of compatibilizing the thermoplastic acrylic resin and the SAN.

The fourth major component is the filler, present in an amount of at least 20% up to 65%, and preferably at least 30%, based on the total weight of the composition, which gives the material a stone-like, ceramic-like feel and sound, as well as higher temperature resistance, lower flammability and higher stiffness, and is required to provide the necessary deep semi-translucency. The filler, preferably barium sulfate, should have an index of refraction which approximates that of the polymer blend in order to maintain the desired deep semi-translucency. If at least about 20% by weight, based on the total composition, of filler is not present, the stone-like, ceramic-like feel and sound, as desired, are not achieved. Preferably, the filler content is 35 to 60% by weight and most preferably 40 to 50% by weight based on the weight of the total composition.

If the quantity of clear thermoplastic acrylic resin goes below 16%, based on the total composition, surface hardness, UV and light stability, and stain resistance become poor, and these qualities are better still if at least 19% acrylic polymer is present, based on total composition. If the quantity of clear thermoplastic impact enhancer, e.g. SAN, is less than 16%, extrudability, toughness and impact resistance suffer, and these properties are better still if at least 19% of SAN is present, based on total composition. Less than 16% of SMA and/or other clear compatibilizing polymer, based on total composition, is normally insufficient to provide adequate compatibilization between the thermoplastic acrylic and the SAN, but better compatibility is achieved if at least 19% of such polymer(s) is present.

As indicated above, barium sulfate, wollastonite, basic aluminum oxalate and kaolin are the preferred fillers, either individually or in admixture, with barium sulfate being most preferred because it provides the resultant filler filled thin thermoplastic rigid sheet product with the best color and deep semi-translucency. Cured thermoset resin particles, preferably melamine resin, thermoset polyester and/or thermoset acrylic particles, can also be used as fillers, especially to provide particular visual effects. Minerals having the hardness of silica or greater, e.g. alumina, are not preferred unless used in relatively small quantities, because they present difficulties in fabrication, particularly in cutting and sanding of the rigid thermoplastic sheet material.

Metals in particulate form are not desired because they limit translucency and make the composition difficult to color. Alumina trihydrate (ATH) cannot be used because it decomposes at a temperature below the processing (e.g. extrusion) temperature. Fillers such as calcium carbonate tend to decompose in an acid environment or have poor resistance to acids, and therefore should only be used in compositions for which it is known that the product will not be used in an acidic environment.

The particle size of the filler may vary within wide limits, but preferably the filler should have a mean particle size of about 0.5 to 50 $\mu$m, most preferably about 1–20 $\mu$m. In most cases the preferred fillers, i.e. barium sulfate, wollastonite, basic aluminum oxalate, kaolin and thermoset resin particles, either individually or in admixture, will constitute substantially 100% of the total filler present, but there are situations where other less preferred fillers may be added. Preferably no more than 50% by weight, and most preferably no more than about 20% by weight, based on the total filler weight, of other less preferred fillers such as hard fillers including alumina and silica, less chemically resistant fillers such as calcium carbonate, and other fillers such as anhydrous aluminum silicates, barium ferrite, mica, feldspar, magnesium oxide, magnesium silicate, talc, glass microspheres, glass fibers, zirconium oxide, ground quartz, ground glass and the like, may be used.

Other components may also be present in minor quantities, including pigment such as titanium dioxide in amounts of 0.2 to 1.5 wt % based on the total weight of the composition, although pigment need not be present; anti-oxidants in the amount of 0.05–0.3 wt % based on the total weight of the composition; and filler dispersing aids and lubricants in an amount of 0.5–2 wt % based on the total weight of the composition. Reference is made to the aforementioned Fisher et al U.S. Pat. No. 5,149,734, the contents of which are hereby incorporated by reference as regards the composition additives including external lubricants, dispersing agents, anti-oxidants and flame retardants.

Other polymers may be added to the aforementioned main components, which other polymers are compatible with the main components or made compatible with the main components, but the quantities of such additive polymers should be kept low, preferably less than 25% of the major polymer present in the smallest amount, i.e. no more than about 25% of the quantity of PMMA or of SAN. For example, if the composition contains, based on total composition weight, 20% PMMA and 20% SAN, then the maximum amount of any additive polymer should not exceed 5%, namely 25% of the 20% SAN. In practice, however, no significant quantity of any additive thermoplastic polymer should be present at all, as these tend to reduce the qualities of the resultant product.

The thermoplastic polymer composition of the present invention is formed into the desired thin surfacing material by molding, preferably by extrusion. Thus, a preferred operation comprises reducing the polymeric components of the composition to a melt within a screw-extruder and extruding the melt, preferably containing the filler particles, through a slot die, e.g. of the so-called "coat-hanger" type, having a length of approximately 4 ft. and a gap of at least 120 mils, preferably about 125–140 mils, onto a chill roll stack, and then pulling, trimming and cutting the resultant rigid sheet to the desired dimensions, e.g. 8 to 12 ft. lengths. The extrusion temperature is desirably in the range of 390° F. to 460° F. Thicker sheet may also be formed. The chill roll is desirably highly polished to give the product a lustrous or glossy surface.

The resultant rigid sheet of thermoplastic thin solid surfacing material, suitably of dimensions 4 ft. by 8 ft. by 0.11–0.12 inches, can be handled and installed in the same manner as high pressure decorative laminate, e.g. trimmed to size, glued to a substrate such as particle board, chip board, fiber board (e.g. MASONITE®) and installed on horizontal and vertical surfaces.

The following examples, offered illustratively, will further describe the present invention:

EXAMPLE 1

An extrudable composition of 6.6% PMMA, 26.7% SAN, 26.7 SMA and 40% barium sulfate is fed to a screw extruder and is extruded as an extrudate onto a polished chill roll into rigid sheet form in thicknesses ranging from 110–120 mils. The composition extrudes well and forms a non-transparent stiff, rigid, impact resistant sheet having a deep semi-translucent appearance, a lustrous surface, and excellent surface hardness, UV and light stability, stain resistance and toughness. It can be glued to a suitable backing material, such as MASONITE®, and used as a thin solid surfacing material for decorative horizontal and vertical surfaces.

EXAMPLE 2

Example 1 is repeated using a composition of 5.5% PMMA, 22.3% SAN, 22.3% SMA and 49.9% barium sulfate. Again, the resultant non-transparent rigid sheet, useful as a thin solid surfacing material, has excellent properties.

EXAMPLE 3

Example 1 is repeated using a composition of 34.8% PMMA, 11.6% SAN, 11.6% SMA and 42% barium sulfate. Again, the resultant non-transparent rigid sheet of thin solid surfacing material has the excellent properties referred to in Example 1.

EXAMPLE 4

Example 1 is again repeated using a composition of 22.8% PMMA, 22.8% of SAN, 11.4% of SMA and 43% barium sulfate. Again, the resultant non-transparent rigid sheet has excellent physical properties and a good appearance.

EXAMPLE 5

Example 1 is again repeated using a composition very similar to that of Example 4, namely 22.8% PMMA, 22.8% of SAN, 11.4% of SMA, 42% barium sulfate, and 1% additives including lubricant. The resultant non-transparent rigid sheet has a deep semi-translucent appearance, a lustrous surface and excellent physical properties.

EXAMPLE 6

Example 1 is again repeated using a composition similar to that of Example 5, namely 22.8% PMMA, 22.9% of SAN and 11.4% of SMA, together with 42% of basic aluminum oxalate in place of the barium sulfate of Example 5, and again 1% additives including lubricant.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A non-transparent thin solid filler-filled thermoplastic decorative surfacing material in rigid sheet form consisting essentially of:
    16–28% by weight of a clear thermoplastic acrylic polymer;
    16–28% by weight of a clear thermoplastic impact enhancer polymer; and
    5–20% by weight of a clear compatibilizing thermoplastic polymer; and
    an amount sufficient of a filler up to 65% by weight based on the total composition to provide said sheet with a deep semi-translucent appearance.

2. A non-transparent decorative surfacing material in thin sheet form according to claim 1 wherein said filler is present amount of 20–60% by weight based on the weight of the total composition.

3. A non-transparent decorative surfacing material in thin sheet form according to claim 1 wherein said acrylic polymer is methyl methacrylate polymer.

4. A non-transparent decorative surfacing material in thin sheet form according to claim 3 wherein said impact enhancer polymer is styrene acrylonitrile copolymer.

5. A non-transparent decorative surfacing material in thin sheet form according to claim 1 wherein said impact enhancer polymer is styrene acrylonitrile copolymer.

6. A non-transparent decorative surfacing material in thin sheet form according to claim 5 wherein said compatibilizing polymer is styrene maleic anhydride copolymer, containing less than 10% maleic anhydride.

7. A non-transparent decorative surfacing material in thin sheet form according to claim 1 wherein said compatibilizing polymer is styrene maleic anhydride copolymer, containing less than 10% maleic anhydride.

8. A non-transparent decorative surfacing material in thin sheet form according to claim 4 wherein said compatibilizing polymer is styrene maleic anhydride copolymer, containing less than 10% maleic anhydride.

9. A non-transparent decorative surfacing material in thin sheet form according to claim 1 wherein said filler comprises barium sulfate, wollastonite, basic aluminum oxalate, kaolin, cured thermoset resin particles or mixtures thereof.

10. A non-transparent decorative surfacing material in thin sheet form according to claim 9 wherein said filler is present in an amount of at least 20% by weight based on the total weight of said sheet.

11. A non-transparent decorative surfacing material in thin sheet form according to claim 9 wherein said filler is present in an amount of at least 35% by weight based on the total weight of said sheet.

12. A non-transparent decorative surfacing material in thin sheet form according to claim 9 wherein said filler is present in an amount of at least 42% by weight based on the total weight of said sheet.

13. A non-transparent decorative surfacing material in thin sheet form according to claim 1 wherein said filler is present in an amount of at least 20% by weight based on the total weight of said sheet.

14. A non-transparent decorative surfacing material in thin sheet form according to claim 1 wherein said filler is present in an amount of at least 35% by weight based on the total weight of said sheet.

15. A non-transparent decorative surfacing material in thin sheet form according to claim 1 wherein said filler is present in an amount of at least 42% by weight based on the total weight of said sheet.

16. A non-transparent decorative surfacing material in thin sheet form according to claim 2 wherein said impact enhancer polymer is styrene acrylonitrile copolymer present in an amount of 19–25% by weight, said compatibilizing polymer is styrene maleic anhydride copolymer containing less than 10% maleic anhydride, said styrene maleic anhydride copolymer being present in an amount of 8–15% by weight, and said filler consists essentially of at least one of barium sulfate, wollastonite, basic aluminum oxalate, kaolin and cured thermoset resin particles, and said clear thermoplastic acrylic polymer is present in an amount of 19–25% by weight.

17. A non-transparent decorative surfacing material according to claim 1 in the form of a thin sheet extrudate of the composition of claim 1.

18. A method of forming a non-transparent, decorative, thin solid filler-filled thermoplastic surfacing material in rigid sheet form in accordance with claim 1, comprising forming a mixture of 16–28% by weight of said clear thermoplastic acrylic polymer, 16–28% by weight of said clear thermoplastic impact enhancer polymer, 5–20% by weight of said clear compatibilizing thermoplastic polymer, and 20–65% by weight of said filler based on the total weight of said mixture, forming the mixture of polymers into a melt containing said filler in the form of particles, and extruding said melt containing the filler particles through a slot die having a length of approximately 4 feet and a gap of at least 120 mils to obtain a hot sheet, and chilling said hot sheet to provide said non-transparent, thin solid filler-filled thermoplastic surfacing material in rigid sheet form.

19. A non-transparent, thin solid filler-filled thermoplastic surfacing material in rigid sheet form made by the process of claim 18.

20. A non-transparent decorative surfacing material in thin sheet form according to claim 19 wherein said filler consists essentially of at least one of barium sulfate, wollastonite, basic aluminum oxalate, kaolin and cured thermoset resin particles, and said clear thermoplastic acrylic polymer is present in an amount of 19–25.

* * * * *